United States Patent [19]

Matsumoto et al.

[11] Patent Number: 4,857,813

[45] Date of Patent: Aug. 15, 1989

[54] SELF-STOPPING MOTOR CONTROL CIRCUIT

[75] Inventors: Yasuki Matsumoto, Sagamihara; Masaru Kato, Hiratsuka, both of Japan

[73] Assignee: Jidosha Denki Kogyo Kabushiki Kaisha, Kanagawa, Japan

[21] Appl. No.: 26,707

[22] Filed: Mar. 17, 1987

[51] Int. Cl.$^4$ ............................ H02P 3/08; H02P 7/68
[52] U.S. Cl. ...................................... 318/54; 318/266; 318/466
[58] Field of Search ............... 318/256, 264, 265, 266, 318/280, 282, 283, 466, 467, 468, 53, 54, 65; 307/9, 10 R

[56] References Cited

U.S. PATENT DOCUMENTS

| | | | |
|---|---|---|---|
| 3,585,470 | 6/1971 | Cornors | 318/53 |
| 3,891,909 | 6/1975 | Newson | 318/282 X |
| 4,001,661 | 1/1977 | Terabayashi | 318/264 |
| 4,234,833 | 11/1980 | Barrett | 318/282 |
| 4,288,726 | 9/1981 | Vazquez-Cuervo et al. | 318/54 |
| 4,338,552 | 7/1982 | Pilz et al. | 318/284 X |
| 4,357,564 | 11/1982 | Deming et al. | 318/282 X |
| 4,468,596 | 8/1984 | Kinzl et al. | 318/286 X |
| 4,471,274 | 9/1984 | Ross et al. | 318/282 |
| 4,514,670 | 4/1985 | Fassel et al. | 318/286 X |
| 4,544,865 | 10/1985 | Sharp | 318/53 |
| 4,649,398 | 3/1987 | Yamamoto et al. | 318/603 X |

OTHER PUBLICATIONS

R. W. Van Pelt et al., "Reel and Capstan Motor Rewind Control", IBM Technical Disclosure Bulletin, vol. 14, No. 2, pp. 615–617, July 1971.

Primary Examiner—Bentsu Ro
Attorney, Agent, or Firm—Sughrue, Mion, Zinn, Macpeak & Seas

[57] ABSTRACT

A motor control circuit is disclosed, which comprises an operation switch to issue the forward rotation or reverse rotation signal, driving means to operate the motor to the forward or reverse direction in response to the forward rotation or reverse rotation signal from said operation switch, rotation detecting means to detect the rotating condition of the motor, and stopping means to cut off the power to said motor when, during the operation of the operation switch, the rotation detecting means continues to detect, for a certain period of time, that the rotation of the motor has been stopped.

5 Claims, 4 Drawing Sheets

SELF-STOPPING MOTOR CONTROL CIRCUIT

BACKGROUND OF THE INVENTION

1. Field Of The Invention

The present invention relates to a motor control circuit used for applications such as the driving device for a power window or sun-roof in a car, which cuts off the power to the motor when the motor is mechanically stopped while the control switch continues to be switched on.

2. Description Of The Background Art

There has been strong desire in the past to have a single control switch, which alone can open the sun-roof and all windows to quickly ventilate the air inside a car when the driver enters the car during the summer season. Also, there has been desire, for the convenience of the users, to have a single control switch, which can totally close the sun-roof and all windows when the driver exists the car.

However, when the sun-roof and all windows are totally opened or totally closed by a single control switch, two or more motors must be simultaneously operated. If there is a difference in the time to totally open or totally close the windows according to the differences in the opening and closing strokes or to the difference in the speeds of all the different motors, it is necessary to continue to operate the control switch until the last sun-roof or window reaches the desired limit of its operation. During this time, the other motors are already at the upper limit or lower limit of their operation and are locked. Even when the motors are in a locked condition, electric current continues to flow and power is wasted for no purpose. Also, the durability and life of the motor are reduced by heating or burn-out.

SUMMARY OF THE INVENTION

The present invention tends to solve such problems by cutting off the supply of the power to the motor and by preventing wasteful consumption of power when the motor reaches the operational end point and is stopped even in case where the control switch continues to be operated. Thus, a safe and reliable motor control circuit is provided by the invention.

Figure 1:
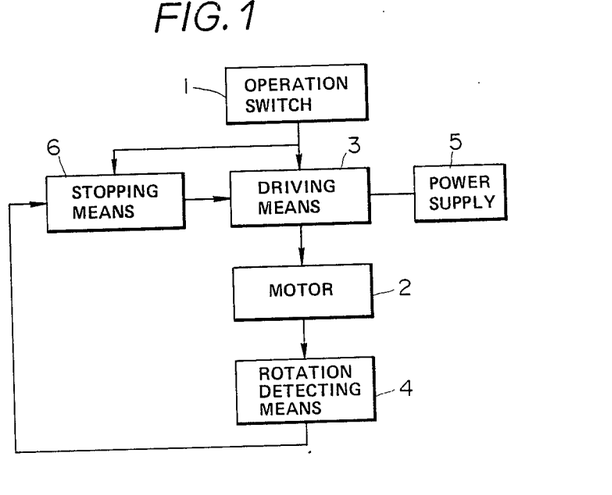
FIG. 1 is a functional block diagram showing an embodiment of the motor control circuit based on this invention.

The constitution of the present invention which achieves the above-mentioned purpose is explained according to the functional block diagram as shown in FIG. 1. The invention comprises a control switch 1 which issues the normal rotation and reverse rotation signal. A driving means 3 drives the motor 2 in the forward or reverse direction in response to the forward rotation or reverse rotation signal issued by the control switch 1. A rotation detecting means detects the rotation direction of the motor 2. A stopping means 6 cuts off the supply of the power from the power supply 5 to the motor 2 when, during the operation of the control switch 1, the rotation detecting means 4 continues to determine, for a certain period of time, that the rotation of the motor 2 is stopped.

The present invention provides protection to the system by cutting off the supply of power from the power supply 5 to the motor 2 by causing the stopping means 6 to stop the driving means 3 so long as the control switch 1 continues to be operated. The power is interrupted if the rotation detecting means 4 of the motor 2 determines to stop the rotation of the motor 2 when the device driven by the motor 2 reaches the operational end and stops the motor 2 during the operation of the motor 2 by the driving means 3 through the operation of the control switch 1. Therefore, in the case where two or more motors 2 are operated by the operation switch 1, it is possible to separately cut off the supply of the power 5 to the motor 2 whose rotation has been stopped.

BRIEF DESCRIPTION OF THE DRAWINGS

The invention will now be described in detail with reference to the accompanying drawings, wherein.

DETAILED DESCRIPTION OF THE INVENTION

Figure 2:
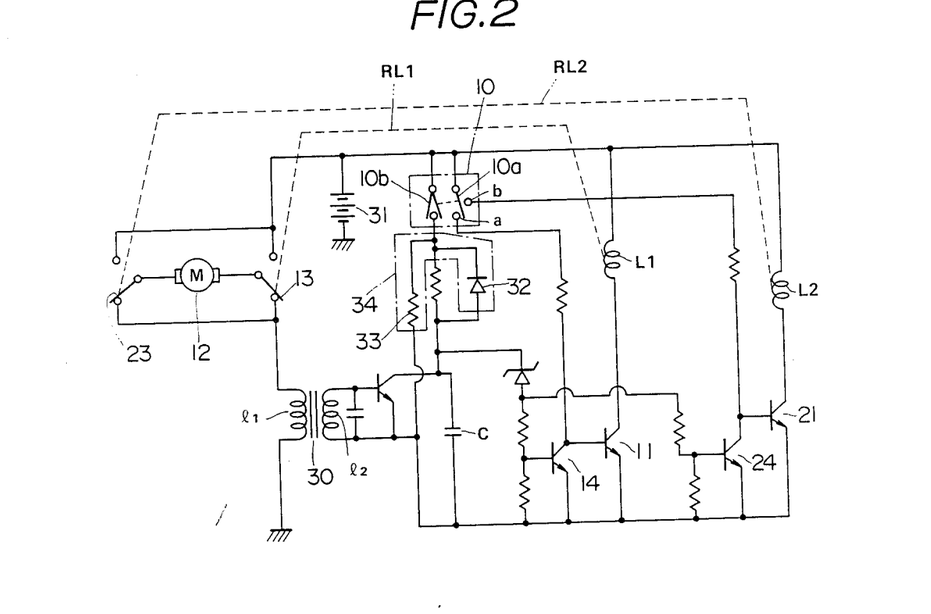
FIG. 2 shows an explanatory drawing indicating the circuit of an embodiment of the motor control circuit based on this invention.

FIG. 2 is an explanatory drawing showing the circuit of the embodiment of the motor control circuit based on this invention.

In FIG. 2, the control switch 10 (corresponding to the control switch 1 shown in FIG. 1) issues the forward rotation or reverse rotation signal. The control switch 10 comprises a change-over contact 10a to change over the rotation to the forward or reverse direction and a power-connecting contact 10b, interlocked by the operation of the change-over contact 10a. The power-connecting contact 10b is able to connect power to a condenser C regardless of whether the change-over contact 10a is at the forward rotation position a or at the reverse rotation position b. A transistor 11 corresponds to the driving means 3 shown in FIG. 1 as a driving means for forward rotation. This transistor 11 is operated only during the period when the condenser C is being charged up to the prescribed potential and stops operation above this level. Thereafter, it does not conduct. When the transistor 11 is conducting, the relay coil L1 of the relay RL1 is actuated, operating the movable contact 13 of the same relay RL1 so that the motor 12 rotates in the forward direction. A transistor 14, acting as a stopping means (corresponding to the stopping means 6 as shown in FIG. 1), cuts off the power to the motor 12 in case the motor 12 stops it rotation when the forward rotation signal has been issued from the control switch 10.

A transistor 21 (corresponding to the driving means 3 as shown in FIG. 1) acts as a driving means for reverse rotation. This transistor 21 is conducting, just as the above-mentioned transistor 11, only until the condenser C is charged to the prescribed potential. When the transistor 21 is operated, the relay coil L2 of the relay Rl2 is actuated, operating the movable contact 23 of the same relay coil L2 to cause the motor 12 to rotate in the reverse direction.

A transistor 24 (corresponding to the stopping means 6 shown in FIG. 1) acts as a stopping means to cut off the supply of power to the motor 12 in case the rotation of the motor 12 is stopped when the reverse rotation signal has issued from said control switch 10. A ripple detector 30 (corresponding to the rotation detecting means 4 shown in FIG. 1), acts as a rotation detecting means to detect the rotating condition of the motor 12. This ripple detector 30 uses AC signals on its primary coil 1 and its secondary coil 2, utilizing the ripple current generated on the primary coil 1 when the motor 12 is rotated. It also operates the transistors 11 and 21 during the rotation of the motor 12 by discharging the condenser C by means of this AC signal. Because this ripple detector 30 generates an AC signal in response to the rotation of the motor 12, it is always able to detect the rotation regardless of the rotational speed of the motor 12, and the application range of the motor 12 is not restricted by its detecting ability. Power is supplied by a power supply 31 (corresponding to the power supply 5 shown in FIG. 1) and a diode 32, which comprises a part of the cancelling means to change the transistor 14 or 24 (i.e., the stopping means) to its non-operatig condition in case the forward rotation or reverse rotation signal is issued by immediately operating the control switch 10 after the rotation of the motor 12 is stopped and the issuance of forward rotation or reverse rotation signal from the operation switch 10 is interrupted. The diode 32 and a resistor 33 make up a cancelling means 34.

Next, the explanation is given on the operation of the motor control circuit having the above-mentioned design.

To explain the case where the motor 12 is rotated in the forward direction, the change-over contact 10a of the operation switch 10 is set to the forward rotation position a. In this case, the condenser C is charged and the base current is supplied to the transistor 11 to make it conduct until this condenser C is charged to the prescribed potential. The transistor 11, supplied with the required base current, is turned to the conductive state, actuating the relay RL1. By actuating the movable contact 13 of the same relay RL1, the motor 12 is rotated in the forward direction. In this case, when the motor 12 is rotated, the ripple current, generated by the rotation of the motor 12, is supplied to the ripple detector 30 and generates its AC signal so that the condenser C is discharged by this AC signal. Specifically, by the discharge of the condenser C, the conductive operation of the transistor 11 is continued.

In the device driven by the motor 12, e.g., in the power window device, the rotation of the motor 12 is stopped when the operated device, i.e., the window, is fully opened. Then, The AC signal is no longer generated from the ripple detector 30 and the discharge of the condenser C is also suspended. When the condenser C is then charged to the predetermined level, the base of the transistors 14 is brought high, so that the base of the transistor 11 is grounded. Thus, the transistor 11 no longer conducts. Therefore, the supply of the power to the motor 12 is cut off. Because the control switch 10 is at the forward rotation position a, the base current is supplied to the transistor 14, i.e., the stopping means. Thus, it is possible to provide protection by completely cutting of the power to the motor 12 when the transistor 11 is turned off.

Then, an explanation is given for the case where the motor 12 is rotated in reverse. The change-over contact 10a of the control switch 10 is set to the reverse rotation position b. In this case, the condenser C is charged, and the base current is supplied to the transistor 12 making it conduct until this condenser C is charged to the prescribed potential. The transistor 21, supplied with the base current, passes a current through its main electrodes, actuating the relay coil L2 of the relay RL2. By actuating the movable contact 23 of the relay RL2, the motor 12 is rotated in the reverse direction. When the motor 12 is rotated in reverse, ripple current is generated, as in the case of forward rotation, from the motor 12 and an AC signal is generated from the ripple detector 30. As in the case of the forward drive transistor 11, the reverse drive transistor 21 continues its conductive operation because the condenser C is not allowed by this AC signal to be charged to the predetermined potential.

In the device driven by said motor 12, e.g., in the power window device, when the operated device, i.e., the window, is fully closed and the rotation of the motor 12 is mechanically stopped, the AC signal is no longer generated from the ripple detector 30. The discharge of the condenser C is stopped and the conduction of the transistor 21 is stopped. Hence, the supply of the power to the motor 12 is cut off. But, because the control switch 10 is at the reverse rotation position b, base current is supplied to the transistor 24, i.e., the stopping means, and the transistor 21 is thereby turned off. Thus, it is possible to provide protection by completely cutting off the supply of power to the motor 12.

When, in the device driven by the motor 12, e.g., in the power window, a hand is caught by the window, the power to the motor 12 is cut off by this motor control circuit. Because the motor 12 is stopped at the same position, the pressure or damage on the hand by the driving force of the motor 12 is avoided. But, because the hand is not released from such condition, it is necessary to operate the control switch 10 to reverse directions and to rotate the motor 12 in reverse. In this case, because the control switch 10 is operated again immediately after the motor 12 is stopped, the diode 32, comprising a part of the cancelling means 34, allows current to flow around the condenser C, thus discharging it and turning the transistor 14 or 24, which is the stopping means during operation, to its non-conductive condition and the motor 12 can be moved.

Accordingly, the motor control circuit, based on the embodiment of this invention, not only cuts off the supply of power to the motor 12 when the rotation of the motor 12 is stopped, but also can be operated again promptly by the control switch 10, providing higher safety and reliability.

Figure 3:
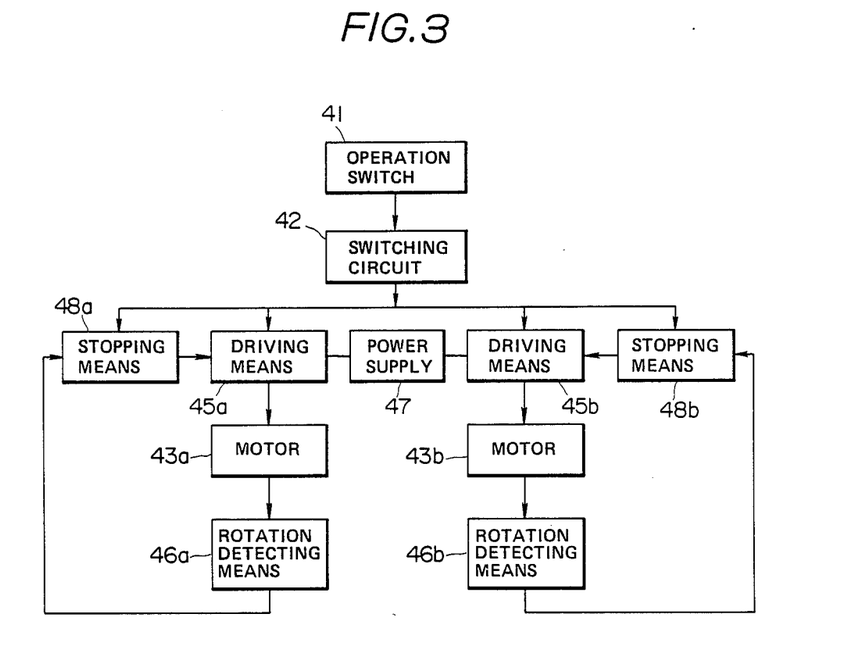
FIG. 3 shows the functional block diagram indicating the composition of another embodiment of the motor control circuit according to this invention.
Figure 4:
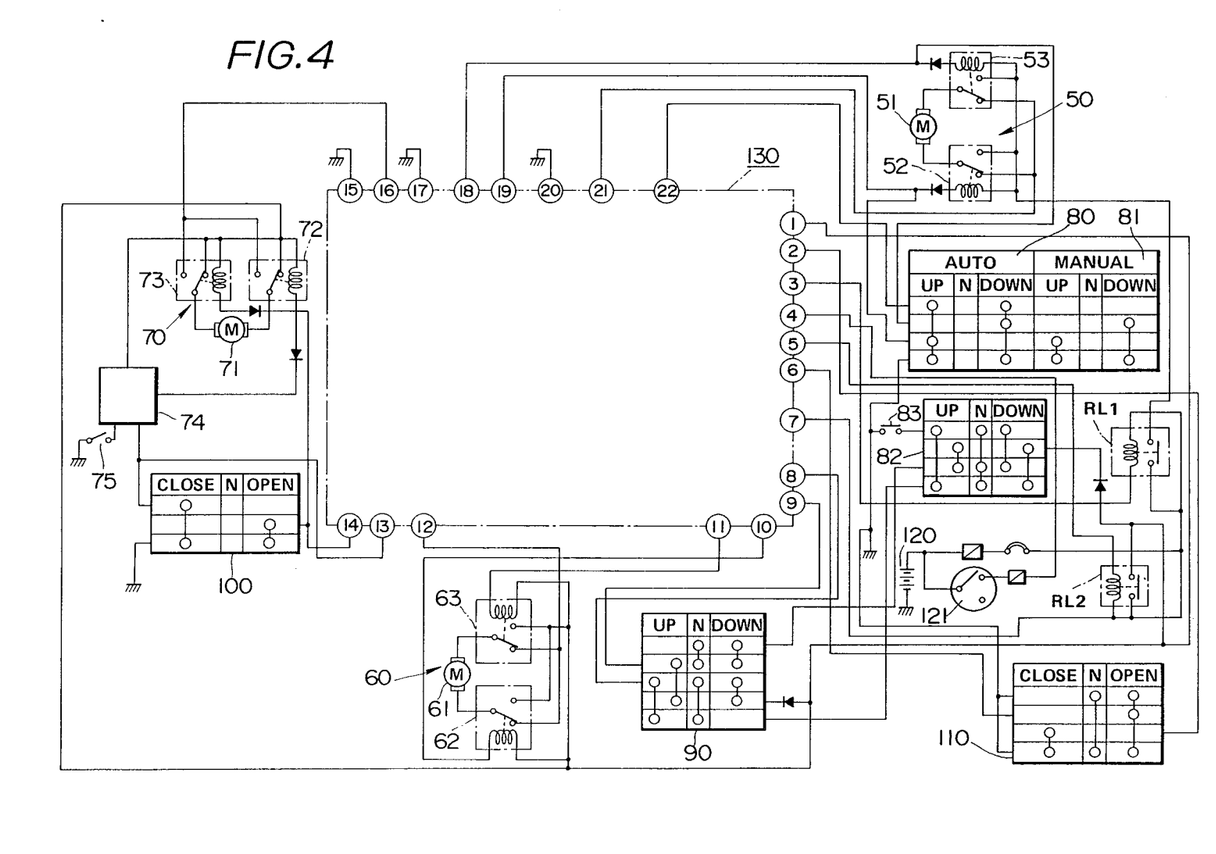
FIG. 4 is an explanatory drawing showing the actual circuit composition.
Figure 5:
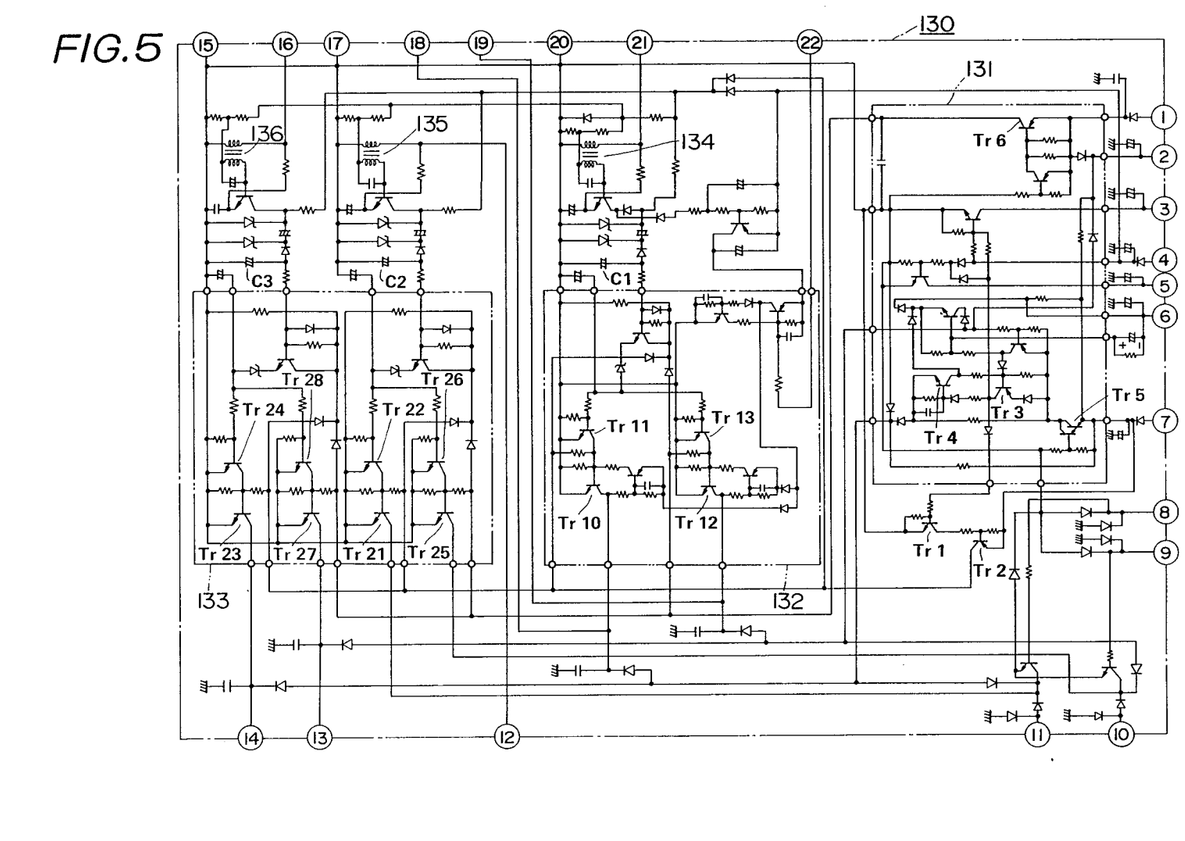
FIG. 5 is an explanatory drawing to show the circuit within the controller as shown in FIG. 4.

FIGS. 3 to 5 illustrate other embodiments of the motor control circuit based on this invention. Here, explanation is given of the example where two or more motors are driven.

FIG. 3 shows a functional block diagram of the motor control circuit, and FIG. 4 is a detailed circuit diagram of this embodiment, in which a power window device and a sun-roof device are provided on the side of the driver's seat and on the side of the front seat passenger. FIG. 5 is a detailed circuit diagram of the controller as shown in FIG. 4.

First, the construction of the motor control circuit according to this embodiment is explained by the functional block diagram as shown in FIG. 3. The circuit comprises an operation switch 41 which issues forward and reverse rotation command signals. A switching circuit 42 issues the forward rotation or reverse rotation signal according to the forward rotation or reverse rotation command signal. Two or more motors 43a and 43b are rotated in the forward or reverse direction by the forward or reverse rotation signal. The driving means 45a and 45b operate the motors 43a and 43b in response to the forward rotation or reverse rotation signal issued by the switching circuit 42. The rotation detecting means 46a and 46b detect the rotating condition of the motors 43a and 43b respectively. The stopping means 48a and 48b cut off the supply of power from the power supply 47 to the respective motors 43a and 43b while a forward or reverse rotation signal is issued from the switching circuit 42 and the rotation detecting means 46a and 46b determine if the rotation of the motors 43a and 43b has stopped.

The circuit operates in such a manner that, by the operation of a single operation switch, two or more motors (two motors are shown in FIG. 3) are operated at the same time. The rotating conditions of the motors 43a and 43b are separately detected by the rotation detecting means 46a and 46b, respectively. For example, when the first rotation detecting means 46a judges that the first motor 43a is stopped, the first stopping means 48a cuts off the supply of the power to the first driving means 45a during the transmission of a forward or reverse rotation signal from the switching circuit 42 in response to the operation of the operation switch 41. Thus, the first motor 43a is protected but the operation of the second motor 43b continues.

In the following, a detailed explanation will be given by the example of actual circuit.

In FIG. 4, a power window device 50 is located on the side of the driver's seat, and this is furnished with a motor 51 to raise or lower the window, on the side of the driver's seat and with relays 52 and 53, which drive the motor 51 in the forward or reverse direction. A power window device 60 is located on the side of the front passenger seat and it also is furnished with a motor 61 to raise or lower the window on the side of the front passenger seat and with relays 62 and 63 to drive the motor 61 in the forward or reverse direction. A sun-roof device 70 is furnished with a motor 71 to open or close the sun-roof, with relays 72 and 73 to drive the motor 71 in the forward or reverse direction, with a timer circuit 74 to stop the sun-roof once just before it is totally closed when the sun-roof is moved toward the closing direction, and with a limit switch 75 to detect the operational end limit of the sun-roof.

An auto switch 80 is installed on the side of the driver's seat to control the power window device 50 on the side of the driver's seat by a single operation. A manual switch 81 drives the power window device 50 in response to the duration of its operation. A manual switch 82 for the side of the front passenger's seat, installed on the side of the driver's seat, drives the passenger power window device 60. A lock switch 83 stops the action of the passenger power window device 60 for the side of the passenger's seat when a switch 90, installed on the side of the front passenger's seat, is operated. The auto switch 80, the manual switch 81, the manual switch 82 and the lock switch 83 for the side of the passenger's seat are combined together and are installed on the side of the driver's seat, e.g., on the arm rest, as the main switch for the power windows.

The switch 90, installed on the side of the front passenger's seat, operated the power window device 60 on that side. A switch 100 operates the sun-roof device 70 to move it in the opening or closing direction.

An operation switch 110 simultaneously opens or closes the driver's power window device 50, the passenger's power window device 60 and the sun-roof device 70 on the side of the passenger's seat. A power supply 120 delivers power through a key switch 121. A first relay RL1 and a second relay RL2 relay power from the power supply 120. A controller 130 controls the power window device 50 on the side of the driver, the power window device 60 on the side of the passenger and the sun-roof device 70.

As shown in FIG. 5, this controller 130 comprises, in itself, a switching circuit 131 to issue the opening direction or closing direction signal in response to the operation of the operation switch 100, a first driving circuit 132 to drive the driver's power window device 50 and, a second driving circuit 133 to drive the passenger's power window device 60 and the sun-roof device 70 on the side of the front passenger's seat. Ripple detectors 134, 135 and 136 operate as the rotation detecting means to detect the rotational state of each of the motors 51, 61 and 71 in each of the devices 50, 60 and 70. Transistors Tr1 and Tr2 operate each of the driving circuit 132 and 133 when the operation switch 100 is operated toward the opening direction.

The switching circuit 131 provides, together with the transistors Tr3 and Tr4, a one-touch function to keep the operation in memory and to issue and maintain the opening direction signal when the operation switch 110 is operated toward the opening direction. It is also furnished with a transistor Tr5 to supply the power from the power supply 120 to the transistors Tr3 and Tr4. Also, the switching circuit 131 comprises a transistor Tr6 to issue the closing direction signal to each of the driving circuits 132 and 133 in response to the operating time when the operation switch 110 is operated toward the closing direction.

Further, the first driving circuit 132 is provided with a transistor Tr10, which is a driving means to drive the motor 51 of the driver's power window device 50 in the opening direction when the opening direction signal is produced. A transistor Tr11 operates as a driving means to drive the motor 51 of the driver's power window device 50 in the closing direction when the closing direction signal is generated. A transistor Tr13 and a condenser C1 actuate the forward and reverse driving transistors Tr 10 and Tr12 until the condenser is charged to the prescribed potential.

Also, the second driving circuit 133 is provided with a transistor Tr21, which is a driving means to drive the motor 61 of the passenger's power window device 60 in the opening direction when the opening direction signal is generated. A transistor Tr22 operates as a stopping means. A transistor Tr23 operates as a driving means to drive the motor 71 of the sun-roof device 70 in the opening direction. A transitor Tr24 operates as a stopping means. A transistor Tr25 operates as a driving means to drive the motor 61 of the passenger's power window device 60 in the closing direction when the closing direction signal is generated. A transistor Tr27 operates as a driving means to drive the motor 71 of the sun-roof device 70 in the closing direction. A transistor Tr28 operates as a stopping means. A condenser C2 actuates the opening and closing driving transistors Tr21 and Tr25 for the passenger's power window device 60 until it is charged to the prescribed potential. A condenser C3 actuates the opening and closing driving transistors Tr23 and Tr27 for the sun-roof device 70 until it is charged to the prescribed potential.

Next, explanation will be given on the operation of a motor control circuit, having the circuit as described above.

First, the key switch 121 is turned on the actuate the first relay RL1 and the second relay RL2 to supply the power. In this case, the transistor Tr5 is also actuated.

Here, explanation is made on the case where, under this condition, all windows and sun-roof are totally opened by operating the operation switch 110 toward the opening direction. Specifically, when the operation switch 110 is set to the opening position, the base current of the transistor Tr3 within the switching circuit 131 is connected and it is turned on. When this transistor Tr3 is actuated, the base current is supplied to the transistor Tr4 and the transistor Tr1 outside the switching circuit 131, operating the transistors Tr4 and Tr1, respectively. When the transistor Tr1 is actuated, the base current is supplied to the transistor Tr2, which is to issue the opening direction signal to each of the driving circuits 132 and 133. Specifically, by operating the operation switch 110 once in the opening direction, the transistors Tr1, Tr3 and Tr4 are turned on, and the opening direction signal is issued to each of the driving circuits 132 and 133 from the transistor Tr2.

Next, the opening direction signal, as introduced to first driving circuit 132 by the operation of the transistor Tr1, supplies the base current to the transistor Tr10, which is a driving means, and, at the same time, charges the condenser C1. In this case, the transistor Tr11 is kept turned off until the condenser C1 is charged to the prescribed potential. Accordingly, the transistor Tr10 is kept turned on, and, when the transistor Tr10 is actuated, the transistors Tr1, Tr2, Tr3 and Tr4 are kept turned on even when the signal input by the operation switch 110 is terminated. Also, the transistor Tr10 actuates the relay 53 of the driver's power window device 50. Specifically, the motor 51 operates the window in the opening direction, because one of the terminals of the motor 51 is connected to the power supply 120 via the first relay RL1 to supply the power and because the other terminal of the motor 51 is grounded via the ripple detector 134. In this case, the rotating condition of the motor 51 is detected by the ripple detector 134. Specifically, when the motor 51 is rotated, motor current including ripple is supplied to the ripple detector 134 and an AC signal is generated in the secondary coil. This AC signal causes the condenser C1 to be discharged so that the operation of the transistor Tr10 is positively maintained while the motor 51 is rotating.

When the window on the side of the driver's seat is totally opened, the motor 51 becomes mechanically locked condition. Then, the rotation of this motor 51 is stopped and the AC signal is no longer generated by the ripple detector 134. Accordingly, because the discharge of said condenser C1 is stopped, the potential of the condenser C1 exceeds the prescribed value and the transistor Tr11 is turned on while the transistor Tr10 is turned off. Because the base current is continuously supplied to the transistor Tr11 even when the operation of the switching circuit 131 is continued, the supply of the power 120 to the motor 51 is kept interrupted.

Next, explanation will be given on the second driving circuit 133. The opening direction signal, as issued from the switching circuit 131, is introduced to the power window driving circuit on the side of the front passenger seat and to the sun-roof driving circuit. First, an explanation is provided for the power window driving circuit on the side of the front passenger's seat. The opening direction signal turns the transistors Tr21 on because the transistor Tr22 is kept turned off while the condenser C2 is being charged up to the prescribed potential, and the transistors Tr1, Tr2, Tr3 and Tr4 are kept turned on even after the operation switch 110 stops issuing the signal. Also, the transistor Tr21 actuates the relay 63 of the passenger's power window device 60. Specifically, because one of the terminals of the motor 61 is connected to the power supply 120 via the second relay RL2 to the power supply 120, and because the other of the terminals of the motor 61 is grounded via the ripple detector 135, the motor 61 operates the window in the opening direction. In this case, the rotating condition of the motor 61 is detected by the ripple detector 135, as in the case of the previously described ripple detector 134. Because the AC signal is no longer generated by the ripple detector 135 as the motor 61 is locked when the passenger window is totally opened, the discharge of the condenser C2 is stopped, and the potential of this condenser C2 exceeds the prescribed potential. Then, the transistor Tr21 is turned off and the base current is continuously supplied to the transistors Tr22 even though the operation of the switching circuit 131 is continued. Accordingly, the supply of the power to the motor 61 is interrupted.

Next, an explanation is made of the sun-roof driving circuit. The opening direction signal turns the transistor Tr24 off while the condenser C3 is being charged to the prescribed potential and the transistors Tr23 is turned on. Then, the transistors Tr1, Tr2 and Tr4 are kept turned on even after the operation switch 110 stops issuing the signal. Also, the transistor Tr23 actuates the relay 73 of the sun-roof device 70. Specifically, because one of the terminals of the motor 71 is connected to the power supply 120 via the relay RL2 to supply the power, and because the other of the terminals of the motor 71 is grounded via the ripple detector 136, the motor 71 operates the sun-roof in the opening direction. In this case, the rotating condition of the motor 71 is detected by the ripple detector 136, as in the case of the previously described ripple detector 134. When the sun-roof is totally opened, the motor 71 is stopped and the AC signal is no longer generated by the ripple detector 136. Accordingly, the discharge of the condenser C3 is stopped and the transistor Tr24 is turned on because the potential of this condenser C3 exceeds the prescribed value. Then, the base current is continuously supplied to the motor 71 even though the transistor Tr23 is turned off and the operation of the switching circuit 131 is continued. Consequently, the supply of the power to the motor 71 is kept interrupted.

In the above, it is explained as if each of the devices 50, 60 and 70 is operated separately. Actually, however, all devics 50, 60 and 70 are simultaneously operated when the operation switch 110 is operated toward the opening direction.

When all of the transistors Tr11, Tr22 and Tr24, which are the stopping means of each of said circuits 132 and 133, are operated, the operation of the transistors Tr3 and Tr4 is stopped, and the issuance of the opening direction signal of the switching circuit 131 is stopped. Specifically, because the supply of the base current to the transistor Tr1 is stopped when the transistors Tr3 and Tr4 are turned off, the transistor Tr2 is also turned off, thus stopping the issuance of the opening direction signal to each of the driving circuits 132 and 133.

Next, explanation is made on the case where all windows and the sun-roof are totally closed by operating the operation switch 110 toward the closing direction. When the operation switch 110 is in the closing position, the base current is supplied to the transistor Tr6 in the switching circuit 131, and it is turned on. When the operation switch 110 is turned to the closing position, unlike the case where they are totally opened, the switching circuit 131 issues the closing direction signal only when the operation switch 110 is operated to ensure the safety that a part of human body or object may not be caught by the window or the sun-roof when they are totally closed. When the transistor Tr6 is operated, the first driving circuit 132 and the second driving circuit 133 are operated. The operation of each of the driving circuits 132 and 133 will be explained in detail one after another.

First, the closing direction signal, as introduced to the first driving circuit 132, supplies the base current to the transistor Tr12, which is a driving means, thus turning it on. In this case, the transistor Tr12 is operated only when the condenser C1 is being charged up to the prescribed potential, and it actuates the relay 12 of the driver's power window device 50. Specifically, because one of the terminals of the motor 51 is connected to the power supply 120 via the first relay RL1 to supply the power, and because the other terminal of the motor 51 is grounded via the ripple detector 134, the motor 51 operates the window in the closing direction. In this case, the rotating condition of the motor 51 is detected by the ripple detector 134, as in the case of the opening direction. And, because the AC signal is no longer issued by the ripple detector 134 when the motor 51 is locked when the driver's window is totally closed, the discharge of the condenser C1 is stoped, and the operation of the transistor Tr12 is stoped, and the supply of the power to the motor 51 is interrupted. Also, because the base current is continously supplied to the transistor Tr13 even though the operation of the switching circuit 131 is continued, power is not connected to the motor 51.

Next, an explanation is made for the second driving circuit 133. The closing direction signal, as issued from the switching circuit 131 is introduced to the driving circuit on the passenger's side and the driving circuit of the sun-roof. First, an explanation is made for the driving circuit of the power window on the passenger's side. The closing direction signal supplies the base current also to the transistor Tr25 when the condenser C2 is being charged up to the prescribed potential, and the transistor Tr25 is turned on, actuating the relay 62 of the power window device 60 on the passenger's side. Specifically, because one of the terminals of the motor 61 is connected to the power supply 120 via the second relay RL2 to supply the power, and because one of the terminals of the motor 61 is grounded via the ripple detector 135, as in the case of the previously described ripple detector 134. When the window on the passenger's side is totally closed, themotor 61 is mechanically locked and the AC signal is no longer generated by the ripple detector 135. Accordingly, the discharge of the condenser C2 is stopped, and the operation of the transistor Tr25 is stopped, and the supply of the power to the motor 61 is interrupted. Even when the operation of the operation switch 110 is continued. power is not connected to the motor 61.

Next, an explanation is made on the driving circut of the sun-roof. The closing direction signal supplies the base current to the transistor Tr27 when the condenser C3 is being charged up to the prescribed potential and the transistor Tr27 is turned on. actuating the relay 72 of the sun-roof device 70. Specifically, because one of the terminals of the motor 71 is connected to the power supply 120 via the relay RL2 to supply the power, and because the other of the terminals of the motor 71 is grounded via the ripple detector 136, the motor 71 operates the sun-roof in the closing direction. In this case, the rotating condition of the motor 71 is detected by the ripple detector 136, as in the case of the previously described ripple detector 134. When the sun-roof is totally closed, the motor 71 is locked and the AC signal is no longer generated by the ripple detector 136. Accordingly, the operation of the transistor Tr27 is stopped, and the supply of the power to the motor 71 is interrupted. Even when the operation of the operation switch 110 is continued, power is not connected to the motor 71.

Consequently, this motor control circuit is provided with a one-touch function, for the convenience of the users, in case each of the devices 50, 60 and 70 is totally opened by the operation switch 110. On the contrary, when they are being totally closed, each of the devices, 50, 60 and 70 cannot be totally closed unless the operation switch 110 is continuously operated in the closing direction in order to increase the safety of the operation.

In the above-mentioned first and second embodiments, an explanation has been given for the case where the ripple detectors 30, 134 and 135 and 136 are installed as the means to detect the rotation. This rotation detecting means is merely to detect whether the motor is being rotated or not, and it is not necessarily limited to the ripple detectors 30, 134, 135 and 136.

As explained above, the motor control circuit based on this invention makes it possible to protect the motors from over-heating and burn-out because the supply of the power to the motors is interrupted when the rotation of the motor is stopped during the operation of the operation switch by means of the circuit design. This circuit includes an operation switch to issue a forward rotation or reverse rotation signal, a driving means to operate the motor in a forward or reverse rotating direction in response to the forward or reverse rotation signal from the operation switch, rotation detecting means to detect the operating condition of the motor, and stopping means to interrupt the supply of the power to the motor when, during the operation of the operation switch, the rotation detecting means continues to detect, for a certain period of time, that the rotation of the motor is stopped. Consequently, a highly desirable effect is obtained to interrupt the supply of the power separately to the stopped motors according to the diffrence in the driving strokes, by providing the rotation detecting means and the stopping means for each motor in case two or more motors are driven by a single operation switch.

What is claimed is:
1. A motor control circuit, comprising:
   an operation switch to issue a forward rotation or reverse rotation signal;
   driving means to operate a motor in a forward or reverse direction in response to the forward rotation or reverse rotation signal from said operation switch;
   rotation detecting means to detect a rotating condition of said motor;

stopping means to cut off the power to said motor when, during the operation of said operation switch, said rotation detecting means continues to detect that the rotation of the motor has been stopped for a certain period of time; and cancelling means for turning said stopping means to a non-operating condition when the forward rotation or reverse rotation signal from said operation switch is interrupted.

2. A motor control circuit, comprising:

a single operation switch to issue a forward rotation or a reverse rotation signal;

a plurality of motors;

a plurality of driving means to operate the motors respectively in a forward or reverse direction in response to the forward rotation or reverse rotation signal from said single operation switch;

a plurality of rotation detecting means to detect rotating conditions of said motors; and a plurality of stopping means to automatically cut off the power to respective ones of said motors independently of the supply of power to others of said plurality of motors when said rotation detecting means continue to detect that the rotation of said respective ones of said motors has been stopped.

3. A motor control circuit comprising:

an operation switch to issue a forward rotation or reverse rotation command;

a switching circuit to issue a forward rotation or reverse rotation signal in response to said forward rotation or reverse rotation command;

a plurality of motors rotating in a forward or reverse direction according to said forward rotation or reverse rotation command;

a plurality of driving means to operate respective ones of said motors in response to said forward rotation or reverse rotation signal transmitted from said switching circuit;

a plurality of rotation detecting means to detect the rotation conditions of said motors; and a plurality of stopping means to automatically cut off the supply of the power to respective ones of said motors independently of the supply of power to others of said motors during the transmission of the forward rotation or reverse rotation signal by said switching circuit when respective ones of said rotation detecting means determines that the rotation of said respective ones of said motors has been stopped.

4. A motor control circuit according to claim 3, wherein said switching circuit transmits and maintains the forward rotation or reverse rotation signal in response to the forward rotation command or reverse rotation command from said operation switch.

5. A motor control circuit accroding to claim 3, wherein each of said rotation detecting means comprises a ripple detector of an AC component of a current passing through a respective one of said motors.

* * * * *